Dec. 25, 1951     F. R. DOTSON     2,579,804
MOTOR TESTING UNIT
Filed Dec. 31, 1948     2 SHEETS—SHEET 2
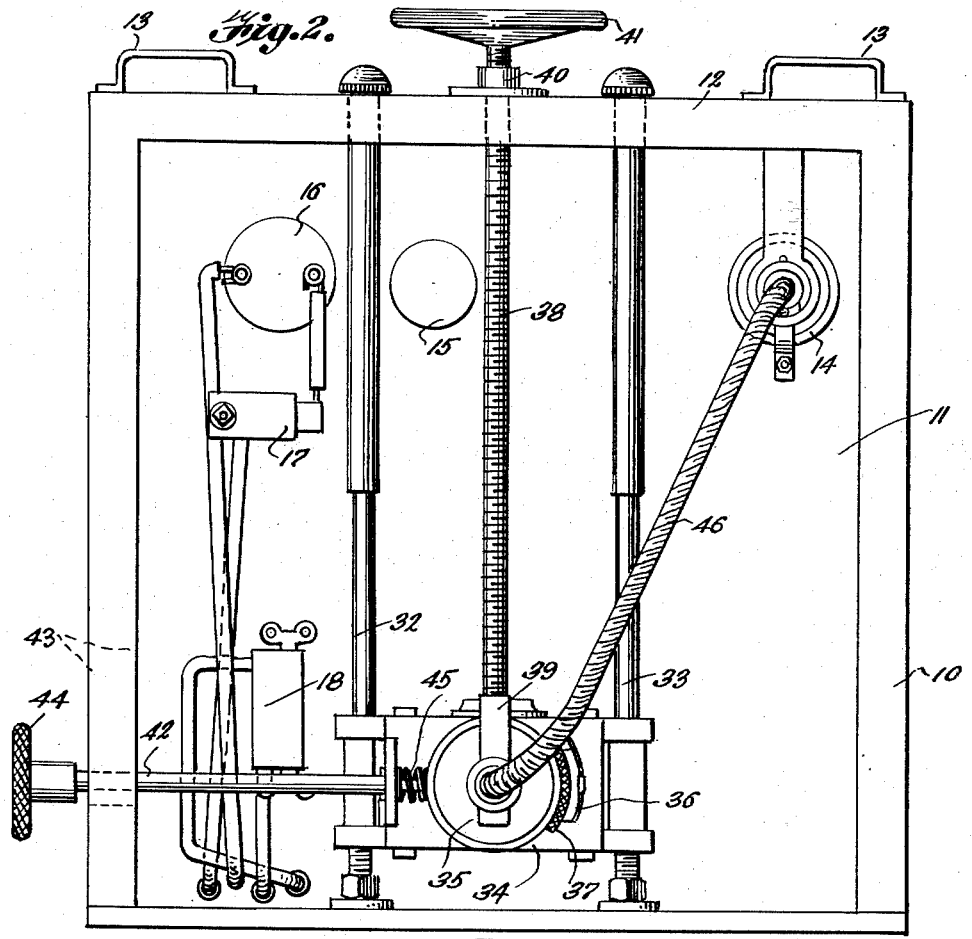
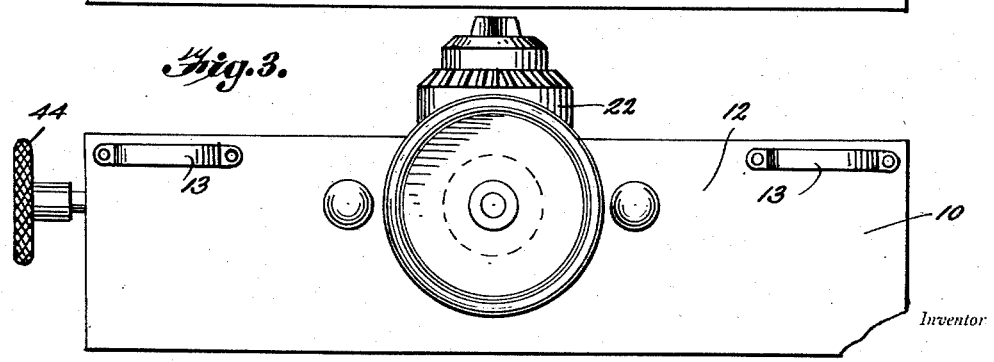
Inventor
FORREST R DOTSON
By *Patrick J. Beavers*
Attorney Patented Dec. 25, 1951

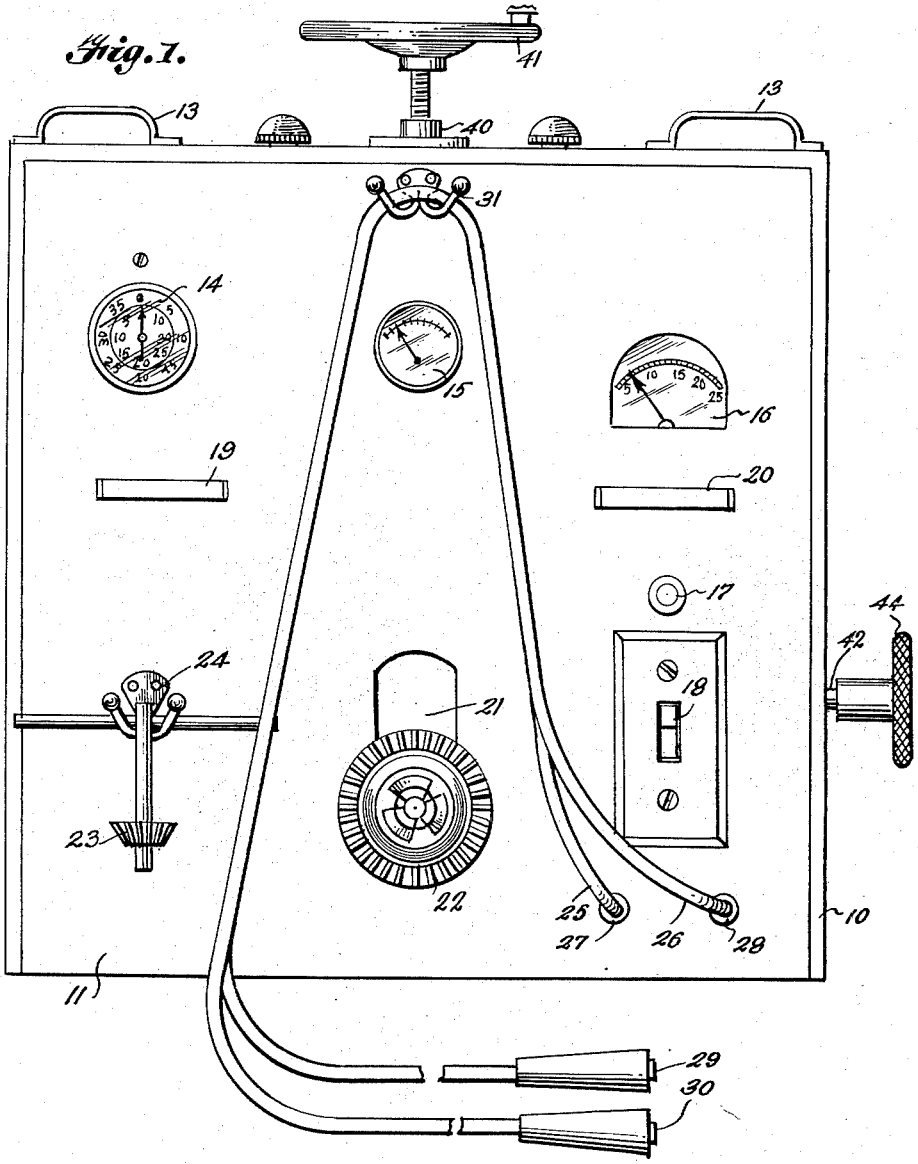

2,579,804

UNITED STATES PATENT OFFICE 2,579,804

MOTOR TESTING UNIT

Forrest R. Dotson, Huntington, W. Va., assignor to Laura C. Dotson, Huntington, W. Va.

Application December 31, 1948, Serial No. 68,699

6 Claims. (Cl. 73—116)

The present invention relates to motor testing units and it consists in the combinations, constructions and arrangement of parts herein described and claimed.

Generally there is provided a motor testing apparatus which is fully contained in a casing, the front of which is provided with the dials of various instruments; such as a tachometer, an ammeter and a volt meter and which has projecting therefrom a chuck into which the shaft of a motor to be tested may be fitted and locked by means of a chuck wrench which normally rests in a rack provided for it on the front of the housing. A main switch and a switch for the ammeter are provided on the front of the casing. The chuck is carried by a spindle which extends into a spindle housing which is vertically slidable upon a pair of guide posts within the casing and the spindle is provided with a worm and gear connection with a vertically disposed shaft which extends upwardly through the top of the casing and terminates in an operating handle, the turning of which operates to raise or lower the effective height of the chuck. A pair of electrical lead wires extend from the front of the casing and each is provided with a clamp connector. The spindle is provided with a brake drum within the spindle housing and a brake shoe with lining is provided for the drum at one side thereof. A shaft extends through a slot in one side of the casing and is provided at its outer end with an operating knob and at its inner end is so connected with the spindle housing that turning of the same will cause greater or lesser pressure of the brake drum to be exerted upon the brake lining and shoe.

It is, accordingly, an object of the invention to provide a compact, fully portable motor testing apparatus particularly adapted to the testing of electric motors.

Another object of the invention is the provision of novel means for connecting the testing apparatus to a motor to be tested.

Another object of the invention is the provision of novel means for adjusting the effective height of the aforementioned connecting means.

Another object of the invention is the provision of novel means for adjustably placing a load upon the motor being tested by the apparatus.

Other and further objects of the invention will become apparent from a reading of the following specification taken in conjunction with the drawings, in which:

Figure 1 is a front elevational view of an embodiment of the invention,

Figure 2 is a rear elevational view of the apparatus with its rear cover removed, and Figure 3 is a plan view of the apparatus shown in Figures 1 and 2.

Referring more particularly to the drawings, there is shown therein a motor testing apparatus comprising a casing 10 having a panel 11 in the front side thereof and having a top 12 to which is fastened a pair of carrying handles 13 adjacent either end thereof.

Mounted in the panel is a tachometer 14, a volt meter 15 and an ammeter 16. A push-button type switch 17 for the ammeter 16 is provided in the panel 11 as is a main switch 18. A name plate 19 and direction plate 20 are mounted upon the face of the panel 11.

Extending through a vertical slot 21 is a chuck 22 and a chuck wrench 23 is normally carried by a bracket 24 affixed to the panel 11. A pair of lead wires 25 and 26 extend through openings 27 and 28, respectively, in the lower end of the panel 11 and terminate in clamp-type connectors 29 and 30, respectively. A bracket 31 is provided at the upper end of the panel 11 for suspending the lead wires 25 and 26 when not in use.

Upon a pair of vertically disposed guide rods 32 and 33 is slidably mounted a spindle housing 34 in which is revolubly mounted a brake drum 35 to which the spindle (not shown) of the chuck 22 is attached. At one side of the brake drum there is provided a brake shoe 36 having a lining 37 in contact with the drum 35. A vertically disposed shaft 38 is threadably connected with the housing 34, as indicated at 39, and extends through a collar 40 centrally disposed in the top 12 and terminates in an operating handle 41.

A brake shoe adjusting shaft 42 extends transversely through a slot 43 in one side of the casing 10 and terminates at its outer end in an operating knob 44. The shaft is threadably connected with the housing 34, as indicated at 45, and its inner end bears against the brake drum 35. A flexible shaft 46 interconnects the brake drum with the tachometer 14 and proper electrical connecting wires are provided for the switches and instruments aforementioned.

In operation, it will be apparent that when it is desired to test a motor, the shaft of the motor is aligned with the chuck 22 by raising or lowering the chuck to a proper height by means of the handle 41. When this is done the chuck is tightened upon the motor shaft by means of the chuck wrench 23 whereupon the connectors 29 and 30 are connected with the motor to provide power therefor. A load may then be placed upon the motor being tested by increasing the frictional contact between the brake drum 35 and the band 37, the knob 44 being utilized for this purpose. The R. P. M., the voltage drop, if any, and the flow of current may then be immediately determined by a reading of the tachometer 14, the volt meter 15 and the ammeter 18. It is therefore possible to determine with exactness whether the motor is performing as the manufacturer originally intended and in accordance with the data conventionally found upon the name plate of such motors.

While but one form of the invention has been shown and described herein, it will be readily apparent to those skilled in the art that many minor modifications may be made without departing from the spirit of the invention or the scope of the appended claims.

What is claimed is:

1. An apparatus of the character described comprising a casing, a panel for the casing having a centrally disposed slot adjacent the lower end thereof, a pair of vertical guide members within the casing, a pintle housing slidably mounted upon the guide members, a vertical shaft threadably connected with the housing and extending through the top of the casing, a handle at the upper end of the shaft, a brake drum revolubly mounted in the housing, a pintle for the drum extending through the slot in the panel, a chuck at the outer end of the pintle and a shoe for the brake carried by the housing.

2. An apparatus of the character described comprising a casing, a panel for the casing having a centrally disposed slot adjacent the lower end thereof, a pair of vertical guide members within the casing, a pintle housing slidably mounted upon the guide members, a vertical shaft threadably connected with the housing and extending through the top of the casing, a handle at the upper end of the shaft, a brake drum revolubly mounted in the housing, a pintle for the drum extending through the slot in the panel, a chuck at the outer end of the pintle, a shoe for the brake carried by the housing and means for varying the pressure of the drum against the shoe.

3. An apparatus of the character described comprising a casing, a panel for the casing having a centrally disposed slot adjacent the lower end thereof, a pair of vertical guide members within the casing, a pintle housing slidably mounted upon the guide members, a vertical shaft threadably connected with the housing and extending through the top of the casing, a handle at the upper end of the shaft, a brake drum revolubly mounted in the housing, a pintle for the drum extending through the slot in the panel, a chuck at the outer end of the pintle, a shoe for the brake carried by the housing and means for varying the pressure of the drum against the shoe, said means including a horizontally extending rod threadably connected to the housing and abutting said drum and having its outer end extending through a vertical slot in the side of the casing and a handle at the outer end of said rod.

4. An apparatus of the character described comprising a casing, a panel for the casing having a centrally disposed slot adjacent the lower end thereof, a pair of vertical guide members within the casing, a pintle housing slidably mounted upon the guide members, a vertical shaft threadably connected with the housing and extending through the top of the casing, a handle at the upper end of the shaft, a brake drum revolubly mounted in the housing, a pintle for the drum extending through the slot in the panel, a chuck at the outer end of the pintle, a shoe for the brake carried by the housing, a tachometer mounted in said panel and a flexible shaft interconnecting the tachometer and the brake drum.

5. An apparatus of the character described comprising a casing, a panel for the casing having a centrally disposed slot adjacent the lower end thereof, a pair of vertical guide members within the casing, a pintle housing slidably mounted upon the guide members, a vertical shaft threadably connected with the housing and extending through the top of the casing, a handle at the upper end of the shaft, a brake drum revolubly mounted in the housing, a pintle for the drum extending through the slot in the panel, a chuck at the outer end of the pintle, a shoe for the brake carried by the housing, a tachometer mounted in said panel, a flexible shaft interconnecting the tachometer and the brake drum and means for varying the pressure of the drum against the shoe.

6. An apparatus of the character described comprising a casing, a panel for the casing having a centrally disposed slot adjacent the lower end thereof, a pair of vertical guide members within the casing, a pintle housing slidably mounted upon the guide members, a vertical shaft threadably connected with the housing and extending through the top of the casing, a handle at the upper end of the shaft, a brake drum revolubly mounted in the housing, a pintle for the drum extending through the slot in the panel, a chuck at the outer end of the pintle, a shoe for the brake carried by the housing, a tachometer mounted in said panel, a flexible shaft interconnecting the tachometer and the brake drum and means for varying the pressure of the drum against the shoe, said means including a horizontally extending rod threadably connected to the housing and having its inner end abutting said drum, its outer end extending through a vertical slot in one side of the housing and a handle at the outer end of said rod.

FORREST R. DOTSON.

REFERENCES CITED

The following references are of record in the file of this patent:

UNITED STATES PATENTS

| Number | Name | Date |
| --- | --- | --- |
| 1,310,396 | Haskins | July 15, 1919 |
| 1,396,312 | Beehler | Nov. 8, 1921 |
| 2,381,549 | Mabery | Aug. 7, 1945 |
| 2,405,060 | Scofield | July 30, 1946 |